United States Patent
Gao et al.

(10) Patent No.: US 9,530,447 B2
(45) Date of Patent: Dec. 27, 2016

(54) ADAPTIVE HAMR POWER DATA STORAGE DEVICE

(71) Applicant: Seagate Technology LLC, Cupertino, CA (US)

(72) Inventors: Kaizhong Gao, North Oaks, MN (US); Wenzhong Zhu, Apple Valley, MN (US); Edward Gage, Lakeville, MN (US); James Mcglennen, Eden Prairie, MN (US); Jon Trantham, Chanhassen, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/633,556

(22) Filed: Feb. 27, 2015

(65) Prior Publication Data

US 2016/0254020 A1   Sep. 1, 2016

(51) Int. Cl.
| | |
|---|---|
| G11B 5/09 | (2006.01) |
| G11B 7/1263 | (2012.01) |
| G11B 5/596 | (2006.01) |
| G11B 5/00 | (2006.01) |
| G11B 5/012 | (2006.01) |

(52) U.S. Cl.
CPC .............. *G11B 7/1263* (2013.01); *G11B 5/09* (2013.01); *G11B 5/596* (2013.01); *G11B 5/012* (2013.01); *G11B 2005/0018* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 6,788,084 B2 | 9/2004 | Jones et al. | |
| 7,263,113 B2 | 8/2007 | Li et al. | |
| 7,433,377 B2 | 10/2008 | Quinn et al. | |
| 7,706,238 B2 | 4/2010 | Yu et al. | |
| 8,406,261 B2 | 3/2013 | Fujita et al. | |
| 2013/0201805 A1 | 8/2013 | Seigler et al. | |
| 2016/0035383 A1* | 2/2016 | Tagami ................ | G11B 7/1263 369/13.26 |

\* cited by examiner

*Primary Examiner* — Brian Butcher
(74) *Attorney, Agent, or Firm* — Hall Estill Attorneys at Law

(57) ABSTRACT

A data storage device may be configured with at least a heat assisted magnetic recording head that has a laser and is connected to a controller. The heat assisted magnetic recording head can be positioned proximal first and second data bits stored on an adjacent data storage medium. A first laser power may be applied by the laser in response to the first data bit being a different magnetic polarity than the second data bit and a different second laser power can be applied by the laser in response to the first and second data bits having a common magnetic polarity.

20 Claims, 4 Drawing Sheets

ADAPTIVE HAMR POWER DATA STORAGE DEVICE

SUMMARY

In accordance with assorted embodiments, a data storage device has a heat assisted magnetic recording head that has a laser, is connected to a controller, and is positioned proximal first and second data bits stored on an adjacent data storage medium. A first laser power is applied by the laser in response to the first data bit being a different magnetic polarity than the second data bit and a different second laser power is applied by the laser in response to the first and second data bits having a common magnetic polarity.

DETAILED DESCRIPTION

As the use of mobile computing devices increases the amount of data being generated, transferred, and stored, the density of data on a data storage device has raised to provide greater data storage capacities in common form factors, such as 2.5" & 3.5" disk drives. The advent of write assisted technologies, such as heat assisted magnetic recording (HAMR), increase the areal data density on a rotating data storage medium to provide large data storage device capacities. However, proper control of the application of heat in a HAMR data storage device can provide additional storage areal density or recorded signal quality compared, for example, to a constant applied power. Thus, there is a continued interest in HAMR data storage embodiments that better control the application of heat to a data storage medium.

Accordingly, a data storage device, in various embodiments, has a heat assisted magnetic recording head configured with a laser, connected to a controller, and positioned proximal first and second data bits stored on an adjacent data storage medium. A first laser power is applied by the laser in response to the first data bit being a different magnetic polarity than the second data bit and a different second laser power is applied by the laser in response to the first and second data bits having a common magnetic polarity. The ability to control the laser power and waveform shape of laser supplied heat allows the data storage device to improve the quality of the recorded signal on the HAMR media.

Figure 1:
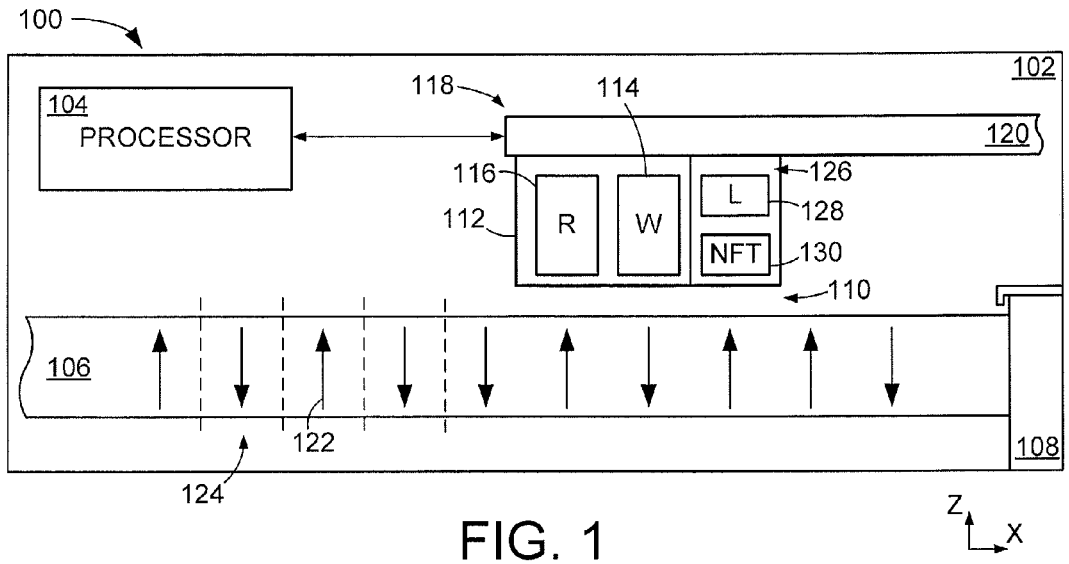
FIG. 1 is a line representation of a portion of an example data storage system configured and operated in accordance with some embodiments.

FIG. 1 displays a block representation of a portion of a data storage system 100 in which various embodiments can be practiced. Although not required or limiting, the data storage system 100 can have one or more data storage devices 102 that have similar or dissimilar configurations, such as data type, capacity, speed, and physical size. As shown in FIG. 1, a rotating hard disk drive data storage device 102 is connected to and controlled by a local processor 104, such as a microprocessor or application specific integrated circuit (ASIC). It is noted that at least one solid-state data storage device, or buffer, may concurrently be connected to the processor 104 to supply temporary and/or permanent data storage capabilities.

The data storage device 102 may be configured with any number of data storage media 106 that rotate via a central spindle 108 to create an air bearing 110 on which a transducing head 112 flies to conduct data access operations. The transducing head 112 can incorporate any number of computing components, such as a data writer 114 and reader 116, that are typically attached to an actuator 118 via a suspension 120, such as a gimbal. It is contemplated that the transducing head 112 and assembly may consist of other components, like microactuators, heaters, contact detection sensors, slider body, and electrical interconnects, that facilitate positioning of the data writer 114 and reader 116 elements over data bits and data tracks on the data storage medium 106 to read and store data bits 122 individually and collectively.

To accommodate data bits 122 being placed closer together in smaller data tracks 124 to provide a greater data capacity and areal data density, the transducing head 112 can employ a HAMR assembly 126 that heats portions of the data storage medium 106 to allow the data writer 114 to more effectively record a high-density magnetic signal compared with a non-heat assisted recording environment.

The HAMR assembly 126 can be incorporated partially or completely on a suspended portion of the transducing head 112 to temporarily heat portions of the data storage medium 106 while writing to lower the magnetic coercivity of selected data bit(s) 122 to allow magnetic flux of a predetermined polarity to write a predetermined magnetic state.

The data storage medium 106 may be heated via any number of heat producing means, such as a laser diode 128 that passes a beam of light energy through a near field transducer 130 to bring the data bit(s) 122 past the data storage medium's Curie temperature and allow for magnetic flux from the data writer 114 to magnetize the data bit 122. Control of the heat generated by the HAMR assembly 126 can correspond to the quality of the recorded magnetic signal. For example, heat energy that is too low can result in poor recorded signal quality and heat energy that is too high can result in adjacent data being erased and/or the recorded signal to be degraded.

It is contemplated that setting a register in a preamplifier can control the amount of heat energy supplied by the HAMR assembly 126. The preamplifier can comprise a digital-to-analog converter (DAC) and a transconductance amplifier to convert a programmed register value into an applied current when a write-enable signal is asserted. When the laser 128 is enabled in the preamplifier, but a write-enable signal is not asserted, the preamplifier can be configured to supply a bias current to the laser 128 that is too low to cause erasure conditions, but minimizes the amount of time involved with transitioning the laser 128 to an active state.

Figure 2A:
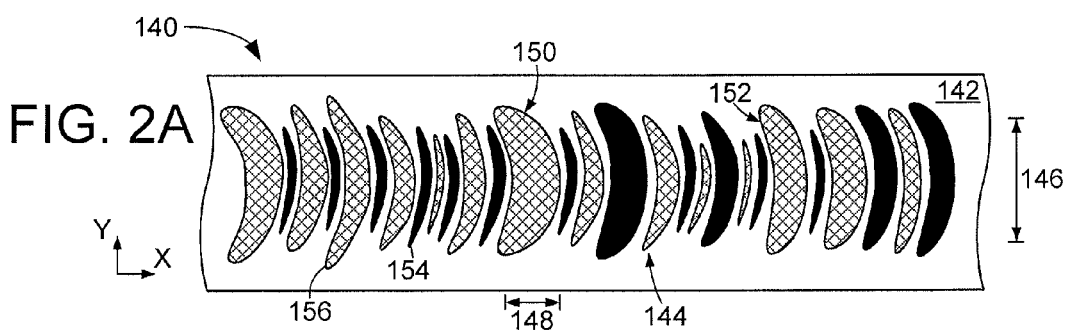
FIGS. 2A and 2B respectively display line representations of portions of an example data storage device arranged in accordance with various embodiments.
Figure 2B:
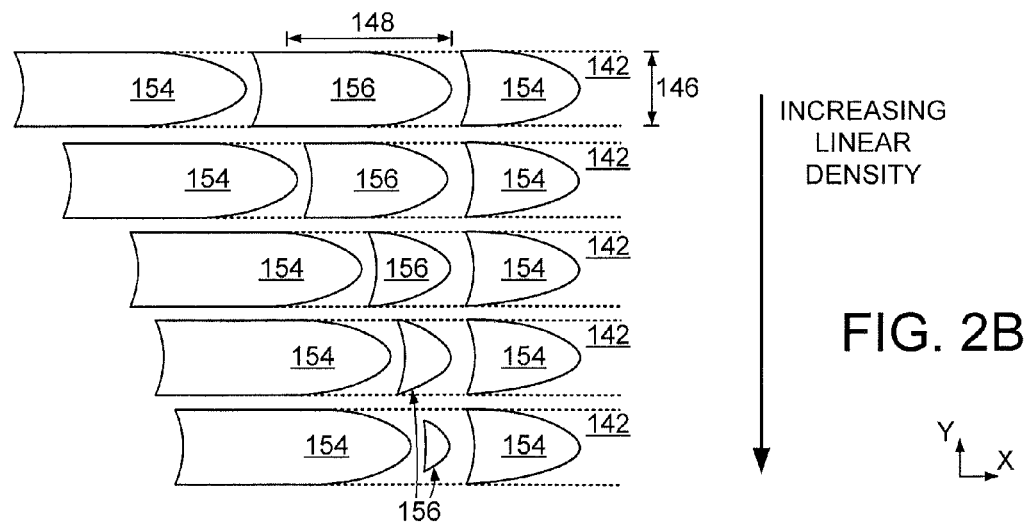

In some embodiments, the heating means of the HAMR assembly 126, which may be characterized as the laser diode 128 and near field transducer 130, can produce a recorded pattern with varying magnetic sizes and shapes. FIGS. 2A and 2B respectively illustrate top view line representations of portions of the magnetic media state of an example data storage device 130 employing at least one HAMR data writer in accordance with some embodiments. In FIG. 2A, the data storage device 130 is displayed with a data track 142 that stores a plurality of magnetic polarities that are read by a transducing head as magnetized regions encoding data bits 144.

A HAMR data writer can allow for increased data density on the data track 142, but can produce magnetic regions 144 that are shaped non-uniformly, as shown. That is, the cross-track width 146 of a magnetic region 144 storing data bits can vary as a function of the down-track length 148 of the region (i.e. vary as the number of consecutive bits of the same value). The energy from a HAMR assembly coupled with the applied magnetic field from the writer can create varying degrees of leading 150 and trailing 152 curvatures and widths in regions with different magnetic lengths. It is noted that short magnetic regions, such as short one-bit region 154, have a smaller width than regions storing multiple bits of the same polarity, such as region 156.

FIG. 2B displays a plurality of different data bits 144 that may be stored on the data track 142 of FIG. 2A depending on the linear data density of data track 142. As shown, a small linear data bit density provides a HAMR assembly more time over a particular portion of the data storage medium to provide HAMR data bits 144 that are similarly shaped and sized regardless of magnetic polarity or the data pattern of previously written bits. Positioning data bits 154 and 156 closer together to provide increased linear data density can reduce the time the HAMR assembly has to switch magnetic polarity and write data, which can result in HAMR data bits 154 and 156 that have different cross-track widths 146, down-track lengths 148, leading edge shapes 150, and trailing edge shapes 152.

It can be appreciated from FIGS. 2A and 2B that increased linear data density and transitions in magnetic polarity for a data stream can result in differently sized and shaped magnetic regions that are difficult to read and differentiate. Hence, various embodiments configure a HAMR data writer and system with the ability to adapt to the linear data density and data pattern to provide increasingly uniform HAMR data bit shapes and sizes. In other words, assorted embodiments adapt to the spacing of data bits and the data pattern being written by transitioning between different heating powers in response to the programmed magnetic polarities of consecutive data bits to provide magnetic regions that have a more consistent shape and size.

Figure 3A:
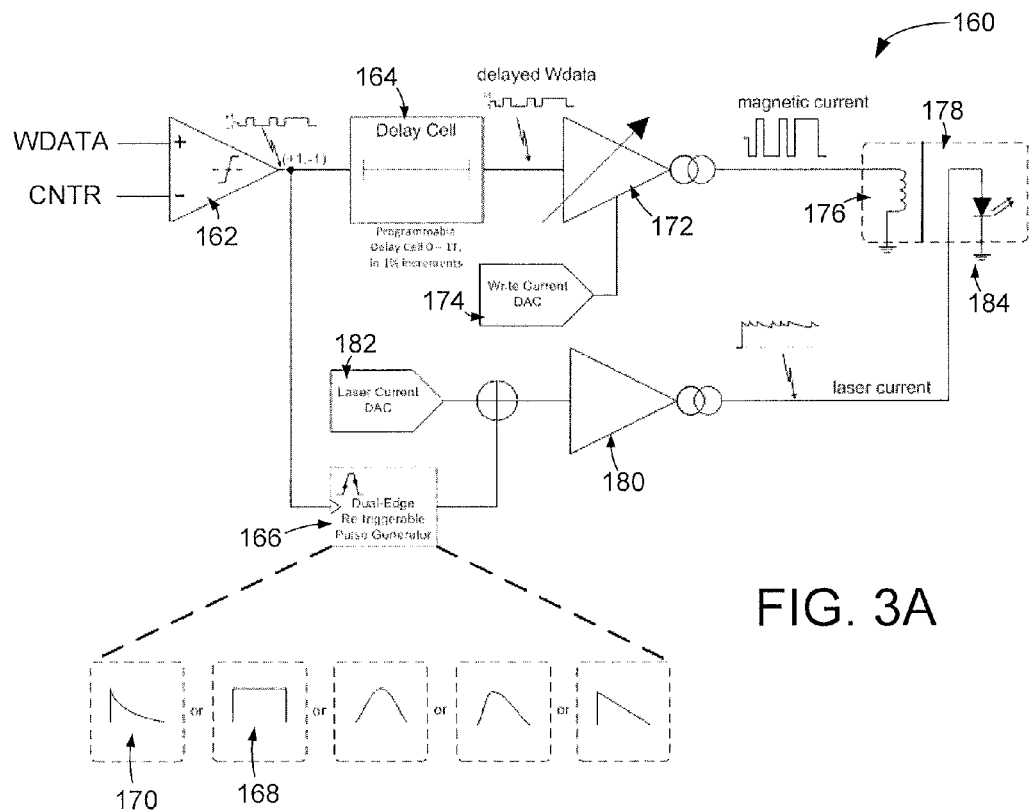
FIGS. 3A and 3B respectively show example preamplifier portions of a data storage device constructed and operated in accordance with assorted embodiments.
Figure 3B:
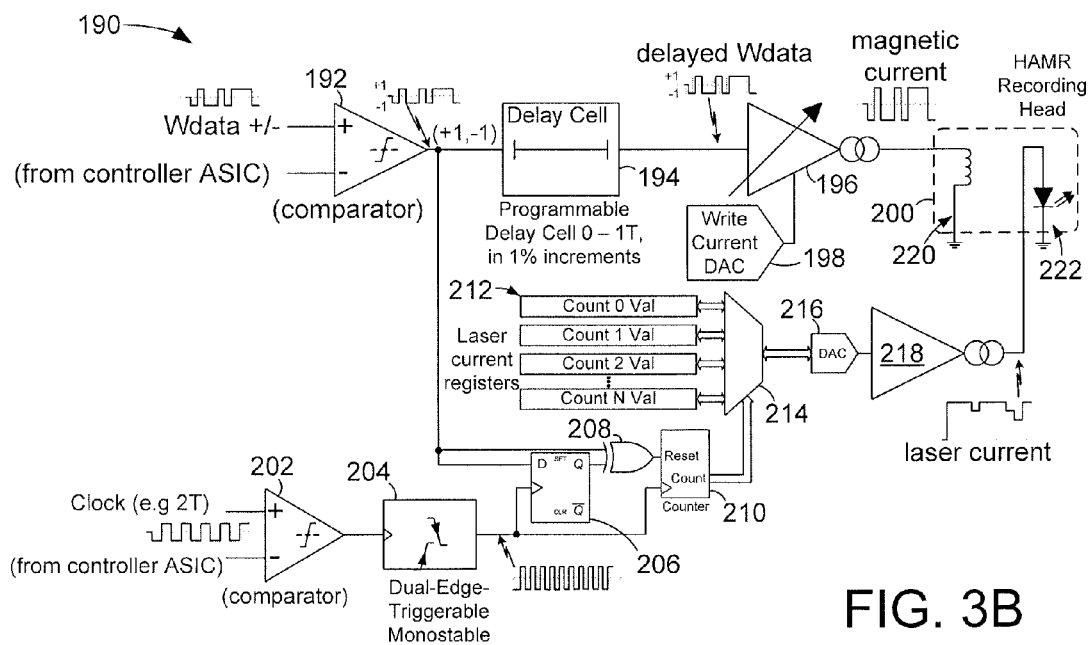

FIGS. 3A and 3B respectively are block representations of example preamplifier portions of a data storage system 160 arranged in accordance with various embodiments to modulate the applied energy in order to record HAMR data bits with more uniform width compared to the magnetic regions of FIG. 2A. The data storage system 160 has a comparator 162 that receives a differential write-data signal from a controller and outputs a bi-polar digital signal to a write delay circuit 164 and a pulse generator 166. The write delay circuit 164 can have programmable cell that allows preset write signal time delays in various increments, such as 1% and 10%, that can allow for pulse and magnetic phase adjustment. The pulse generator 166 may be a dual edge re-triggerable pulse generator that can provide a variety of different pulse shapes, as shown by the symmetric 168 and asymmetric 170 pulse waveforms, for example. It is noted that pulse shapes other than those shown in FIG. 3 can be applied in accordance with assorted embodiments.

The output signal from the delay circuit 164 goes into an operational transconductance amplifier 172 along with a current-control signal from a write DAC 174 to control write current to a data writer 176 portion of a transducing head 178. Although not shown, the amplifier 172 can have controls enabling signal equalization, such as transition pre-emphasis. Signals from the pulse generator 166 are fed into a write driver 180 summed along with a laser current control from a laser DAC 182. The writer driver 180 can be an operational transconductance amplifier that outputs a laser current with a generated waveform to a HAMR assembly 184 of the transducing head 178. The configuration of the data storage system 160 allows transitions in the WDATA signal to trigger the pulse generator 166 to output a pulse that is added to the baseline laser current.

In the event additional magnetic transitions occur while a pulse has been sent, the pulse generator 166 can begin a new pulse that is implemented in combination with the write delay circuit 164. Through the operation of the preamplifier of FIGS. 3A and 3B, laser current can be supplied to the HAMR assembly 184 in continuous or pulsed modes. In continuous mode, laser power is generally held constant while writing, with the notable exception of boosting current at the start of a write operation. During pulsed mode, the HAMR assembly 184 pulses once per bit cell (1T), which reduces the average heat of the target data storage medium and increases the transition sharpness between bit cells. Control of the pulsing operation can be provided by adding a differential pair of control signals from a data read channel to the preamplifier, which allows a transition of signals to trigger the preamplifier to send a burst of laser current to the laser diode that is defined by a waveform and duration set in preamplifier control registers.

It is noted that by leveraging preamplifier pulsing circuitry to provide laser current/power that adapts to changing environmental and data patters, a data writer differential pair can be run into the data writer input and the HAMR pulsing input. In accordance with some embodiments, preamplifier timing parameters and current values are adjusted to provide a continuous waveform that use transitions in data writer magnetic polarity to boost laser current.

FIG. 3B is an alternate embodiment of a block representation of a portion of an example preamplifier portion of a data storage system 190 arranged in accordance with various embodiments to modulate the applied energy in order to record HAMR data bits with more uniform width compared to the magnetic regions of FIG. 2A. The data storage system 190 has a comparator 192 that receives a differential write-data signal (WDATA) from a controller and outputs a bi-polar digital signal to a write delay circuit 194, a D flip-flop 206, and a XOR gate 208. The write delay circuit 194 can have programmable cell that allows preset write signal time delays in various increments, such as 1% and 10%, that can allow for laser and magnetic phase adjustment.

The output signal from the delay circuit 194 goes into an operational transconductance amplifier 196 along with a current-control signal from a write DAC 198 to control write current to a data writer 220 portion of a transducing head 200. Although not shown, the amplifier 196 can have controls enabling signal equalization, such as transition pre-emphasis.

The data storage system 190 further contains a comparator 202 that receives a 2T clock signal from the controller ASIC. Monostable multivibrator 204 is used to generate a 1T clock from the transitions of the clock from comparator 202. Alternately, the monostable can be eliminated by supplying a 1T clock from the controller ASIC, although this has the disadvantage of doubling the clock frequency transmitted from the controller to the preamplifier. The 1T clock signal from monostable 204 supplied to D flip-flop 206 and counter 210.

The combination of D flip-flop 206 and XOR gate 208 generates a magnetic transition detection that is used to reset counter 210. Note that for proper operation of this circuit, clock transitions must be received slightly after WDATA transitions. This delay of clocking can be performed in the controller or in the preamplifier. The action of the comparator circuit is such that whenever a magnetic transition is detected, the counter is reset to state 0. If a magnetic transition is not detected upon a clock the counter is incremented. The output from counter 210 is fed to multiplexer circuit 214. Multiplexer 214 selects the laser current value from a set of laser current registers 212. The output of multiplexer circuit 214 is fed to a digital to analog converter circuit 216 which is fed to transconductance amplifier 218 which generates current fed to the laser diode 222 of recording head 200.

This arrangement of circuitry of data storage system 190 allows for programmatic control of laser current versus transition width, facilitating the uniform width control of FIG. 2A.

Figure 4:
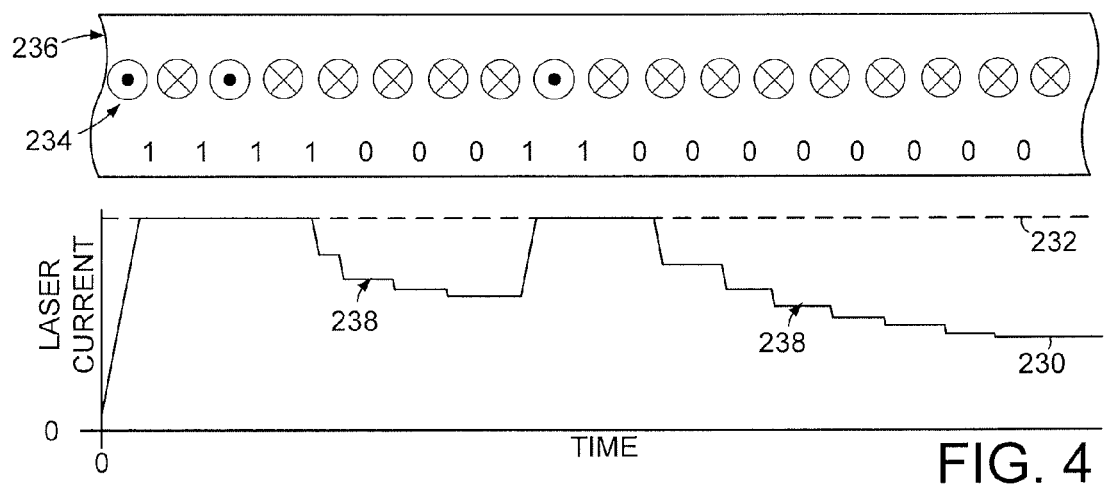
FIG. 4 depicts line representations of structural and operational portions of an example data storage device configured in accordance with some embodiments.

FIG. 4 graph an example laser waveform 230 that can be generated by the preamplifier of FIG. 3 in accordance with various embodiments to provide uniform bit cell shapes and sizes regardless of environment and data pattern conditions. The waveform 230 corresponds with continuous laser operation mode where a baseline laser current level 232 is maintained while magnetic transitions (1) are being conducted on sequential data bits 234 positioned on a common data track 236. In other words, the baseline continuous laser current is maintained when sequential data bits 234 have differing magnetic polarities.

The baseline laser current level 232 is reduced, either suddenly or gradually in steps illustrated by regions 238, in response to sequential data bits 234 have a common magnetic polarity (0). The laser current can be reduced by any amount or percentage, such as 1%, 5%, or 25%, to optimize the write width for low linear data density data bits 234 that are written to a common magnetic polarity. Assorted embodiments tune the laser current level and waveform depending on various transducing head and media characteristics, such as temperature, fly height, and write coil activity, to optimize the baseline laser current level 232 and the reduced laser current regions 238 and achieve the highest areal data capacity.

The waveform 230 illustrates how laser power can be optimized based on the data pattern written to a corresponding data storage medium. It is noted that data write current can also be optimized in response to the data pattern. Through the reduction in laser power at regions 238, the power into a near field transducer portion of a data writer HAMR assembly is reduced to increase HAMR assembly reliability and decrease overall power consumption. However, optimized laser power is not limited to continuous laser operation mode.

Figure 5:
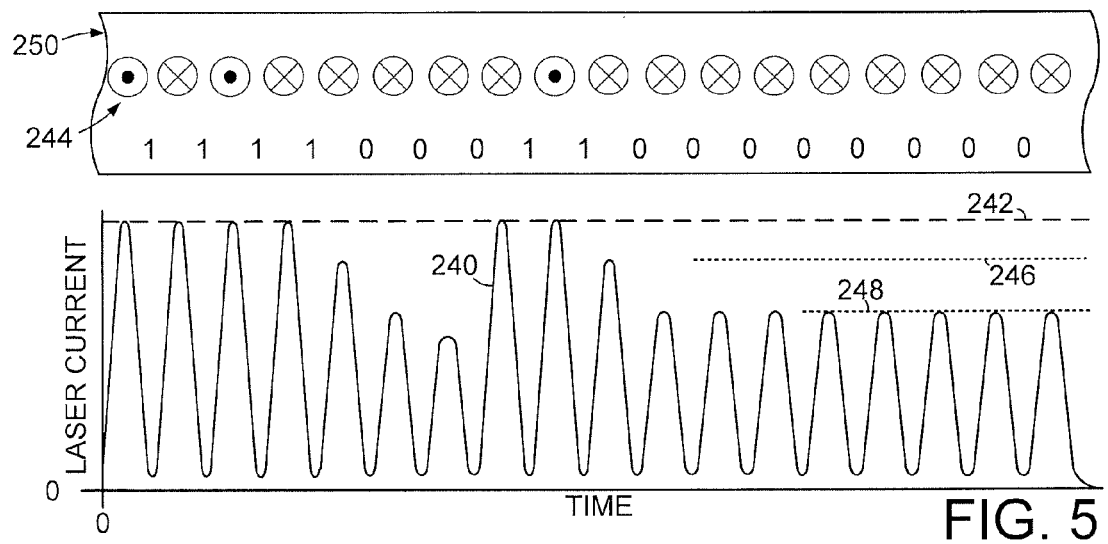
FIG. 5 illustrates structural and operational portions of an example data storage device arranged in accordance with various embodiments.

FIG. 5 graphs an example waveform 240 that can be generated by the preamplifier of FIG. 3 in accordance with some embodiments to optimize HAMR data writing in pulsed laser operation mode. The pulsed waveform 240 illustrates how the preamplifier can provide an elevated pulse laser current value 242 when a transition between data bits 244 is experienced and one or more reduced pulse laser current values 246 and 248 when there is a common magnetic polarity in sequential data bits 246 stored on a common data track 250. It is noted that the parabolic, symmetric laser current pulses shown in FIG. 5 are not required or limiting as any symmetric or asymmetric pulse waveform can selectively be applied in response to the data bit 244 pattern.

The pulsing of laser current waveforms allows a preamplifier to apply similar or dissimilar consecutive pulses, which can accommodate a diverse variety of data patterns and environmental conditions to provide near uniform HAMR data bit 244 physical sizes. As shown, consecutive data bits 244 with dissimilar magnetic polarities corresponds with the preamplifier sending the elevated laser current value 242. Although a single reduced laser current value 246 can be applied in response to consecutive data bits 244 having a common magnetic polarity, some embodiments progressively reduce the laser current from the first reduced value 206 to a second reduced value 248. It is contemplated that the preamplifier may further reduce the laser current lower than the second value 248.

Figure 6:
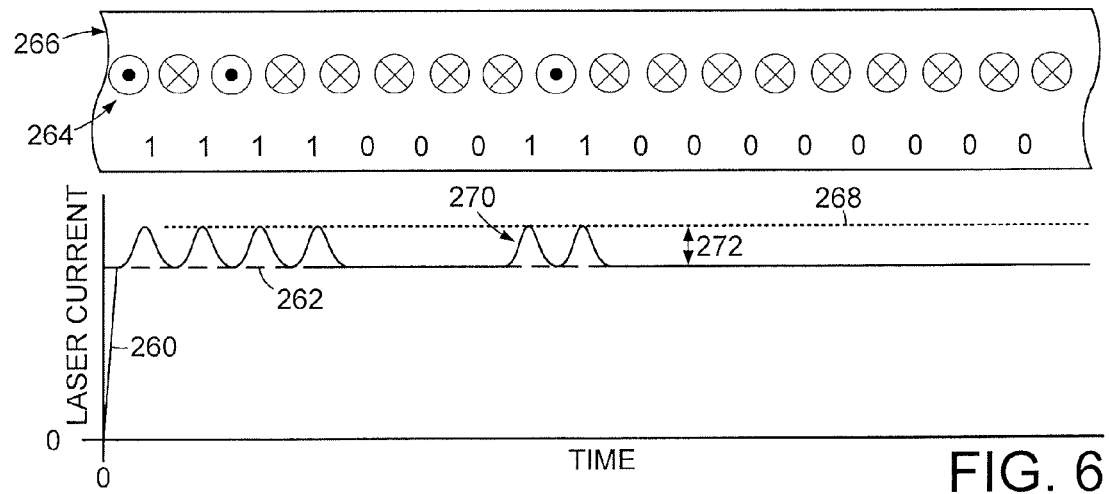
FIG. 6 provides structural and operational portions of an example data storage device configured in accordance with assorted embodiments.

It can be appreciated that the waveform 240 of FIG. 5 applies a waveform for each pulse as the laser current is cycled and the waveform 230 of FIG. 4 applies a continuous waveform that maintains an elevated laser current 232. FIG. 6 displays an example laser waveform 260 that can be generated by the preamplifier of FIG. 3 in accordance with assorted embodiments to provide uniform bit cell shapes and sizes. The waveform 260 combines aspects of waveforms 230 and 240 by maintaining a baseline laser current 262 regardless of the data pattern of data bits 264 on a data track 266.

The waveform 260 responds to transitions in HAMR data writer magnetic polarities and dissimilar consecutive data bits 264 by bumping the laser current to an elevated current value 268. The bumped laser current can have a waveform 270 that is symmetric or asymmetric and independent of the overall waveform 260. As such, the bumped laser current value 268 can be defined by an increase 272 from the baseline laser current 262. The combination of the maintenance of the baseline laser current 262 with the bumped current value 268 decreases the risk of erasure conditions in high linear data density environments, which increases the data track density per inch of a data storage medium. In some embodiments, the bumped waveforms 270 are triggered by a data write current that changes direction each time a data bit transition (1) occurs.

Figure 7:
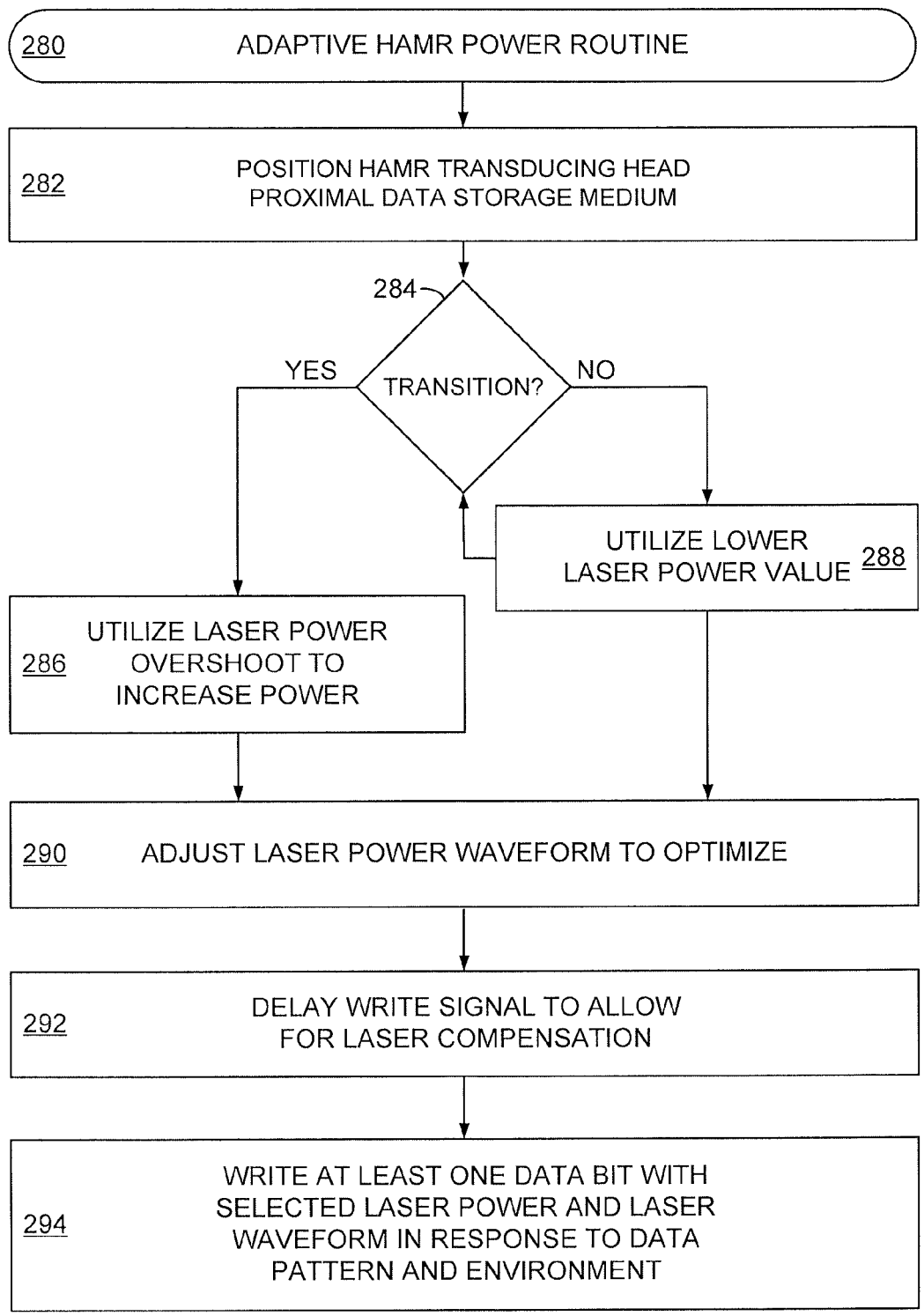
FIG. 7 plots an example degradation mitigation routine carried out in accordance with some embodiments.

FIG. 7 illustrates an example adaptive HAMR power routine 280 that is carried out in accordance with assorted embodiments. The routine 280 begins with at least one transducing head employing a HAMR assembly to be positioned proximal a data storage medium in step 282. It is contemplated that multiple separate transducing heads may be separated from a single data storage medium by air bearing surfaces that concurrently conduct data access operations on data bits stored on different surfaces of the data storage medium.

The pattern of data bit magnetic polarities on a data storage medium surface is evaluated in decision 284 to determine if a polarity transition is present. Dissimilar consecutive data bit polarities triggers step 286 to utilize laser power overshoot to increase laser current (or power) value to write one or more data bits. If decision 284 determines no transition is present, step 288 utilizes a lower laser current (or power) value to write at least one data bit before returning to decision 284. It is noted that steps 286 and 288 can be conducted in a continuous waveform, as shown in FIG. 4, pulsed waveforms, as shown in FIG. 5, or bumped waveforms, as shown in FIG. 6.

Next, step 290 adjusts laser power waveform shape to complement the laser power waveform size chosen in steps 286 and/or 288. The adjusting of laser power value and waveform corresponds with step 292 delaying a data write signal in a preamplifier to allow for laser power and waveform compensation. It is noted that the laser power and waveform adjustments may be implemented in a proactive fashion so that the write signal delay of step 292 is negated. The delayed write signal and adapted laser waveform come together at step 294 to write at least one data bit. With steps 286, 288, and 290, the data bit(s) written in step 294 can be adapted to the data pattern previously written, the data pattern to be written, and the environment in which HAMR data writing is to be conducted, such as device temperature and transducing head skew angle.

It is noted that routine 280 is not required or limiting as various aspects can be changed and removed just as steps and decisions can be added. For example, assorted embodiments may conduct progressive lower laser current (or power) values in response to multiple common data bit magnetic polarities. Through the altering of laser power (or current) during a HAMR data writing operation as a function of the data pattern to be written, HAMR data bits can have more uniform shapes and sizes that provide increased linear data density. The application of extra laser current, or power, in response to transitioning magnetic polarities can ensure ample power to write a data bit with a near uniform shape and size. Meanwhile, the reduction in applied laser current, or power, in response to similar magnetic polarities reduces the risk of erasure conditions.

The ability to adapt laser power, or current, using a pre-defined pulsing waveform sent upon each magnetic transition allows symmetric and/or asymmetric waveforms to provide HAMR data bits with near uniform shapes and sizes. In some embodiments, a laser current waveform width and/or amplitude is tuned in response to environmental conditions, such as fly-height of the transducing head, data writing rate, device temperature, and heater position. With the incorporation of the write delay circuitry, a preamplifier can compensate laser current amplitude and waveform shape without altering the preamplifier circuitry. That is, a preamplifier can leverage its exiting pulsing circuitry to produce a tuned laser current output. For example, a data writer differential pair can be connected to both a data writer and HAMR pulsing inputs. As another non-limiting example, preamplifier timing parameters and current values can be adjusted to provide a continuous laser current waveform and use data writer magnetic transitions to boost laser current.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. A method comprising:
positioning a heat assisted magnetic recording (HAMR) head proximal first and second data bits stored in a data storage medium, the HAMR head comprising a laser and connected to a controller;
comparing the first data bit to the second data bit with a comparator of the controller, the comparator connected to a write pole of the HAMR head via a write driver and to a laser of the HAMR head via a laser driver;
applying a first laser power with the laser in response to the first data bit being different than the second data bit; and
applying a second laser power with the laser in response to the first data bit being the same as the second data bit, the first and second laser powers being different.

2. The method of claim 1, wherein the first and second data bits are different by having opposite magnetic polarities.

3. The method of claim 1, wherein the first laser power is greater than the second laser power.

4. The method of claim 1, wherein the controller provides first and second waveforms to the laser for pulsed application of the first and second laser powers.

5. The method of claim 4, wherein the controller delays writing data with the HAMR head until the first waveform is implemented.

6. The method of claim 4, wherein the first waveform has a first pulse shape and the second waveform has a second pulse shape, the first and second pulse shapes being different.

7. The method of claim 4, wherein the first waveform differs from the second waveform by having a different width and amplitude.

8. The method of claim 7, wherein the different width and amplitude are chosen by the controller in response to measured HAMR head fly height and data rate.

9. The method of claim 1, wherein the data storage medium is heated with the first and second laser powers each generated with different electrical currents being passed through a laser diode coupled through a near-field transducer.

10. The method of claim 1, wherein the laser is maintained in an active state while the HAMR head flies from the first data bit to the second data bit.

11. An apparatus comprising a heat assisted magnetic recording (HAMR) head positioned proximal first and second data bits stored in a data storage medium, the HAMR head comprising a laser and connected to a controller adapted to provide a first laser power in response to the first data bit being different than the second data bit and a second laser power in response to the first data bit being the same as the second data bit, the first and second laser powers being different, the controller comprising a comparator connected to a write pole of the HAMR head via a write driver and to a laser of the HAMR head via a laser driver.

12. The apparatus of claim 11, wherein the controller comprises a write current digital-to-analog converter (DAC) and a laser current DAC.

13. The apparatus of claim 11, wherein the controller comprises a pulse generator and a write delay circuit.

14. The apparatus of claim 13, wherein the write delay circuit is programmable to a plurality of different delay times.

15. The apparatus of claim 12, wherein the write driver and laser driver are respectively connected to separate laser and write current sources.

16. A method comprising:
positioning a heat assisted magnetic recording (HAMR) head proximal first and second data bits stored in a data storage medium, the HAMR head comprising a laser and write pole and connected to a controller;

comparing the first data bit to the second data bit with a comparator of the controller, the comparator connected to a write pole of the HAMR head via a write driver and to a laser of the HAMR head via a laser driver;

applying a first laser power with the laser in response to the first data bit being a different magnetic polarity than the second data bit;

writing a first polarity to the first data bit with the write pole;

applying a second laser power with the laser in response to the first data bit having a common magnetic polarity as the second data bit, the first and second laser powers being a different; and writing a second polarity to the second data bit with the write pole.

17. The method of claim 16, wherein a preamp connected to the HAMR head and controller provides at least one continuous waveform to the laser for each writing step.

18. The method of claim 17, wherein a first continuous waveform is asymmetrical.

19. The method of claim 17, wherein a first continuous waveform is symmetrical and a second continuous waveform is asymmetrical.

20. The method of claim 19, wherein the first continuous waveform is provided to the laser when the HAMR head is writing the first data bit and the second continuous waveform is provided to the laser when the HAMR head is writing the second data bit.

* * * * *